(12) United States Patent
Yoshida (10) Patent No.: US 8,308,399 B2
(45) Date of Patent: Nov. 13, 2012

(54) CUTTING INSERT AND INDEXABLE TOOTH CUTTING TOOL USING THE SAME

(75) Inventor: Satoru Yoshida, Iwaki (JP)

(73) Assignee: Tungaloy Corporation, Fukishima (JP)

( * ) Notice: Subject to any disclaimer, the term of this patent is extended or adjusted under 35 U.S.C. 154(b) by 21 days.

(21) Appl. No.: 13/169,860

(22) Filed: Jun. 27, 2011

(65) Prior Publication Data

US 2011/0255925 A1    Oct. 20, 2011

Related U.S. Application Data

(63) Continuation of application No. PCT/JP2009/007215, filed on Dec. 24, 2009.

(30) Foreign Application Priority Data

Dec. 25, 2008    (JP) .................................. 2008-329919

(51) Int. Cl.
    B23F 21/12    (2006.01)
    B23F 21/14    (2006.01)
    B23C 5/20     (2006.01)

(52) U.S. Cl. ................................. 407/42; 407/26; 407/20

(58) Field of Classification Search .............. 407/20–29, 407/40, 42, 48; B23F 21/12, 21/14; B23C 5/20
    See application file for complete search history.

(56) References Cited

U.S. PATENT DOCUMENTS

| | | | | |
|---|---|---|---|---|
| 1,904,584 A | * | 4/1933 | Wildhaber | 407/21 |
| 2,267,181 A | * | 12/1941 | Wildhaber | 407/29 |
| 2,315,147 A | * | 3/1943 | Wildhaber | 409/51 |
| 2,823,448 A | * | 2/1958 | Krumme | 407/22 |
| 4,060,881 A | * | 12/1977 | Ryan et al. | 407/22 |
| 4,525,108 A | * | 6/1985 | Krenzer | 407/22 |
| 4,566,827 A | * | 1/1986 | Neumueller | 407/42 |
| 4,569,619 A | * | 2/1986 | Newton | 407/15 |
| 4,699,549 A | * | 10/1987 | Shimomura et al. | 407/42 |

(Continued)

FOREIGN PATENT DOCUMENTS

EP    70489 A    *    1/1983

(Continued)

OTHER PUBLICATIONS

International Search Report in PCT/JP2009/007215, dated Mar. 30, 2010.

(Continued)

*Primary Examiner* — Andrea Wellington
*Assistant Examiner* — Sara Addisu
(74) *Attorney, Agent, or Firm* — Womble Carlyle (57) ABSTRACT

A cutting insert is removably mountable on an insert seat formed in a peripheral of a tool body rotated around an axis O and of substantial disc shape. The cutting insert includes a substantially planar insert body of a substantially square shape in plan view, a flank at an upper face of the body, a rake face at a side of the body intersecting with the flank, and a cutting edge at an intersection ridge between the rake face and the flank. The cutting edge is a substantial involute in side view of the body, the rake face is inclined to an inside of the body from an upper toward a lower face, and at least a front end arranged in a peripheral of the tool body is concave constituting a part of a substantially conical side face.

4 Claims, 10 Drawing Sheets

U.S. PATENT DOCUMENTS 4,812,087 A * 3/1989 Stashko .......................... 407/42
5,244,318 A * 9/1993 Arai et al. ....................... 407/42
5,692,860 A * 12/1997 Kramer .......................... 407/34

FOREIGN PATENT DOCUMENTS

| JP | 57-118129 U | | 7/1982 |
| JP | 57144622 A | * | 9/1982 |
| JP | 58-98126 U | | 7/1983 |
| JP | 62166920 A | * | 7/1987 |
| JP | 2005-66780 | | 3/2005 |

OTHER PUBLICATIONS

International Preliminary Report on Patentability dated Jun. 29, 2011 issued in corresponding International Application No. PCT/JP2009/007215.

* cited by examiner

CUTTING INSERT AND INDEXABLE TOOTH CUTTING TOOL USING THE SAME

This application is a Continuation of International Application No. PCT/JP2009/007215, filed Dec. 24, 2009 and published as WO 2010/073681 on Jul. 1, 2010, which claims priority to Japanese Patent Application No. 2008-329919, filed Dec. 25, 2008. The contents of the aforementioned applications are incorporated by reference herein in their entirety.

BACKGROUND OF THE INVENTION

1. Field of the Invention

The present invention relates to a cutting insert used in tooth cutting work for cutting tooth grooves of a gear or the like and an indexable tooth cutting tool using the cutting insert, in particular mainly for cutting an involute gear.

2. Description of the Related Art

A formed tooth cutting tool is used in tooth cutting work by a forming method of cutting out a tooth profile of a gear by an edge profile having the same contour as that of the tooth profile of the gear to be cut. In a conventionally known formed tooth cutting tool, cutting inserts are mechanically mounted on a plurality of insert mounting seats arranged along a circumferential direction in an outer peripheral portion of a substantially disc-shaped body rotated around an axis line.

The cutting insert attached to the indexable tooth cutting tool is typically a negative insert formed in a substantially square, planar shape. The insert is provided with a cutting edge in an intersection ridge line portion between a flank provided on a square face and a rake face provided on a side face perpendicular to the flank. The cutting edge is formed in an involute curved line shape corresponding to an involute tooth profile used in a majority of gears.

In a case where the cutting insert is mounted on an insert mounting seat, an axial rake angle is negative, thereby leading to poor cutting performance and high cutting resistance at cutting. Therefore, chattering vibrations tend to be easily generated, which raises a problem of inviting degradation of cutting accuracy, a reduction of tool lifetime due to damage of the cutting edge, and the like.

Figure 10A:
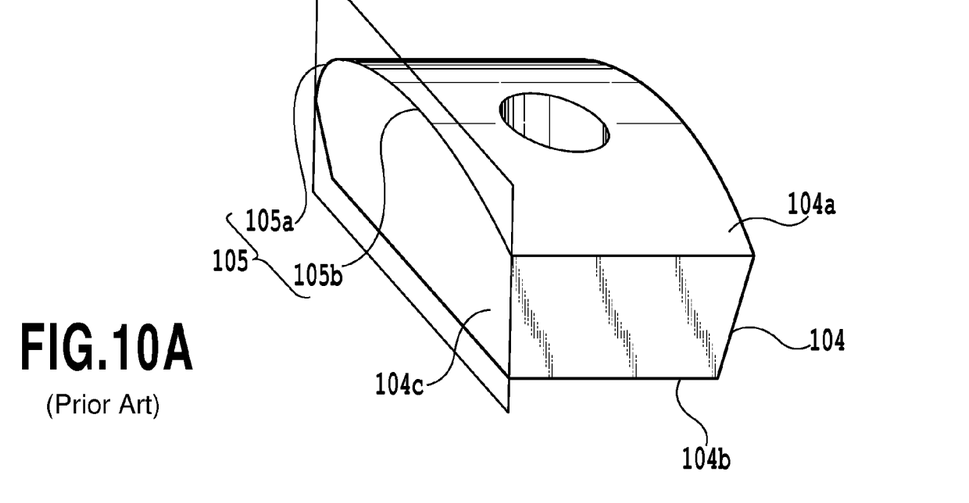
FIG. 10A is a conceptual perspective view explaining a configuration of a cutting insert mounted on a conventional throwaway type of tooth cutter.
Figure 10B:
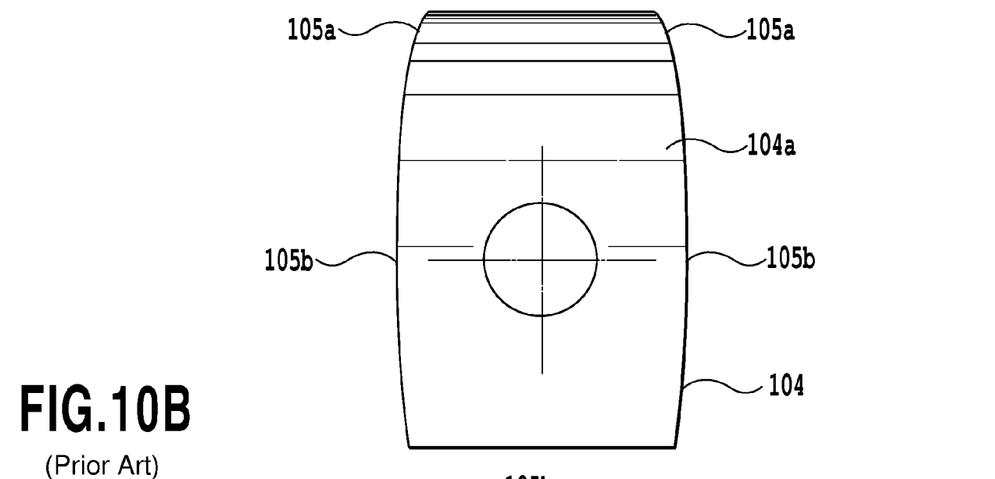
FIG. 10B is a conceptual plan view explaining the configuration of the cutting insert mounted on the conventional throwaway type of tooth cutter.
Figure 10C:
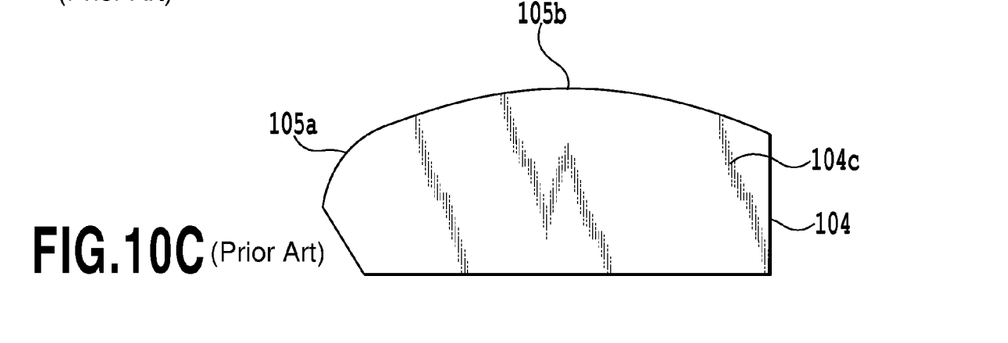
FIG. 10C is a conceptual side view explaining the configuration of the cutting insert mounted on the conventional throwaway type of tooth cutter.

For overcoming this problem, in a cutting insert for a tooth cutter disclosed in Japanese Patent Laid-Open No. 2005-66780, as shown in FIG. 10A to FIG. 10C, an insert body 104 has a side face 104c which is formed to be gradually inclined to an inside of the insert body 104 from an upper face 104a of the insert body 104 toward a lower face 104b thereof, wherein intersection ridge lines between the side face 104c of the insert body 104 and the upper face 104a of the insert body 104 are defined as cutting edge ridges 105a and 105b for cutting tooth bottom and tooth plane portions of the involute gear.

In the invention according to Japanese Patent Laid-Open No. 2005-66780, the side face 104c of the insert body 104 as a rake face is composed of a flat plane inclined in a constant angle. However, when this inclination angle is excessively large, there is a possibility that the cutting edge ridge 105a for cutting tooth bottom portions of the involute gear located in a low position of an edge height from the lower face 104b to the cutting edge ridge 105 of the insert body 104 is biased inside of the insert body 104 in a plan view as seen from a direction opposing the upper face 104a of the insert body 104. On the other hand, there is a possibility that the cutting edge ridge 105b for cutting tooth profile portions of the involute gear located in a high position of the edge height is inflated outside of the insert body 104 in the plan view as seen from the direction opposing the upper face 104a of the insert body 104.

Therefore, in a state where the insert body 104 is mounted on the tool body, a radial rake angle γf in the vicinity of the cutting edge ridge 105a for cutting the tooth bottom portion of the gear is excessively negative, and the cutting performance is deteriorated as compared to the cutting edge ridge 105b of the other portion. In consequence, this conventional type of insert has a problem that the inclination angle which can be applied to the side face 104c of the insert body 104 serving as a rake face is limited.

SUMMARY OF THE INVENTION

An aspect of the present invention is provided with a cutting insert for removably mounting on an insert mounting seat formed in an outer peripheral portion of a substantial disc-shaped tool body which is rotated around an axis line. The cutting insert comprises a substantially planar insert body formed in a substantially square shape in a plan view, a flank provided on an upper face of the insert body, a rake face provided on a side face of the insert body to intersect with the flank, and a cutting edge provided in an intersection ridge line portion between the rake face and the flank, wherein the cutting edge is formed in a substantially involute curved line shape in a side face view of the insert body, the rake face is inclined to an inside of the insert body from an upper face toward a lower face thereof, and at least a front end portion arranged in an outer peripheral side of the tool body is formed in a concave curved face shape constituting a part of a substantially conical side face.

According to the above invention, the rake face may be constructed of a plurality of concaved curved faces constituting respective parts of substantially conical side faces.

In addition, according to the above invention, the cutting edge may be formed in a substantially straight line shape in the plan view.

A different aspect of the present invention is provided with an indexable tooth cutting tool in which the above-described cutting insert is arranged, comprising a substantial disc-shaped tool body which is rotated around an axis line and a plurality of insert mounting seats provided in an outer peripheral portion of the tool body in a staggered manner along a circumferential direction, wherein the cutting insert is removably mounted on the insert mounting seat in such a manner that a radial rake angle is negative.

Further features of the present invention will become apparent from the following description of exemplary embodiments (with reference to the attached drawings).

DETAILED DESCRIPTION

Hereinafter, an embodiment of a cutting insert according to the present invention and an indexable cutting tool using the cutting insert will be described with reference to FIG. 1 to FIG. 8.

Figure 1:
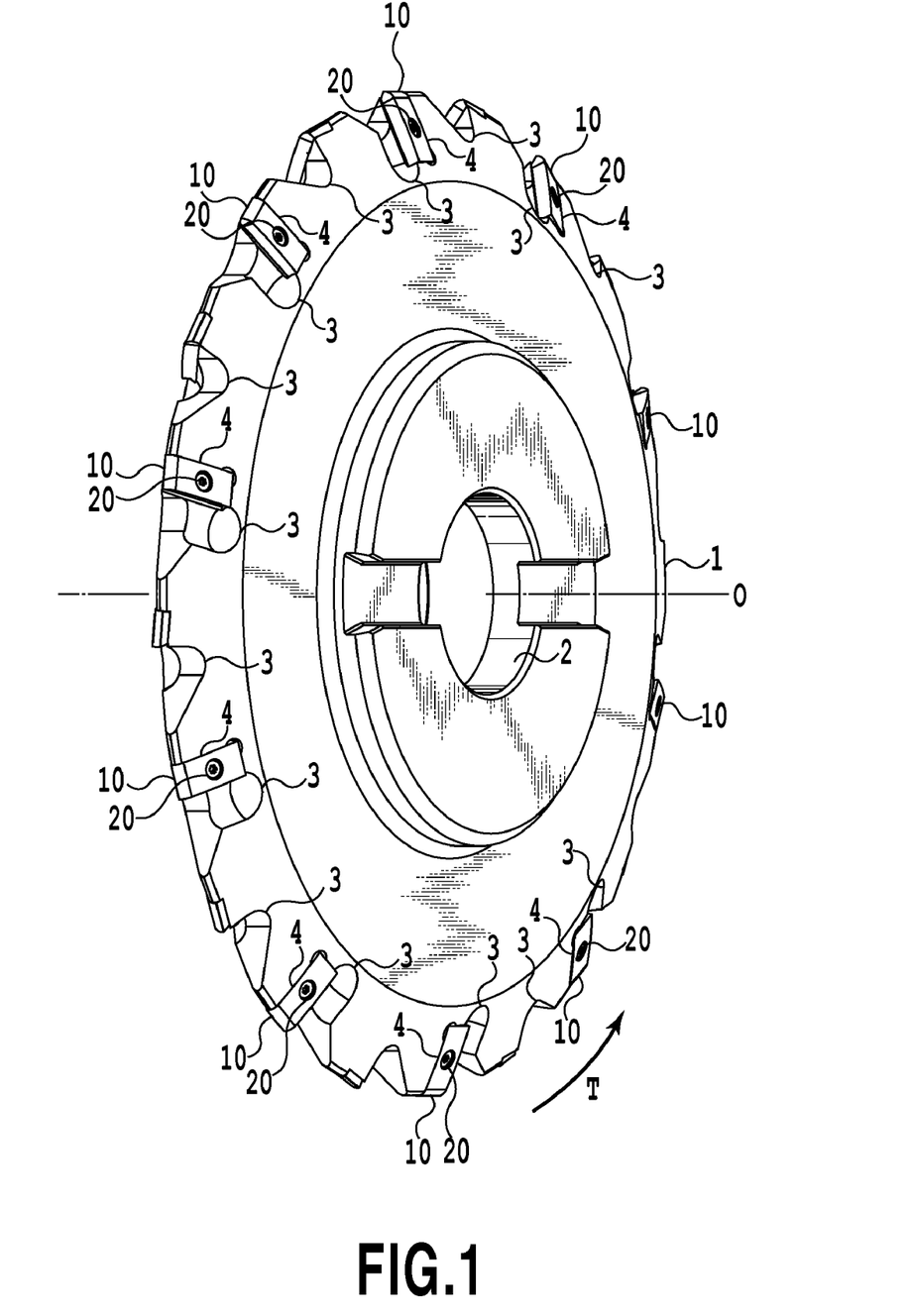
FIG. 1 is a perspective view showing a tooth cutter according to an embodiment of the present invention.
Figure 2:
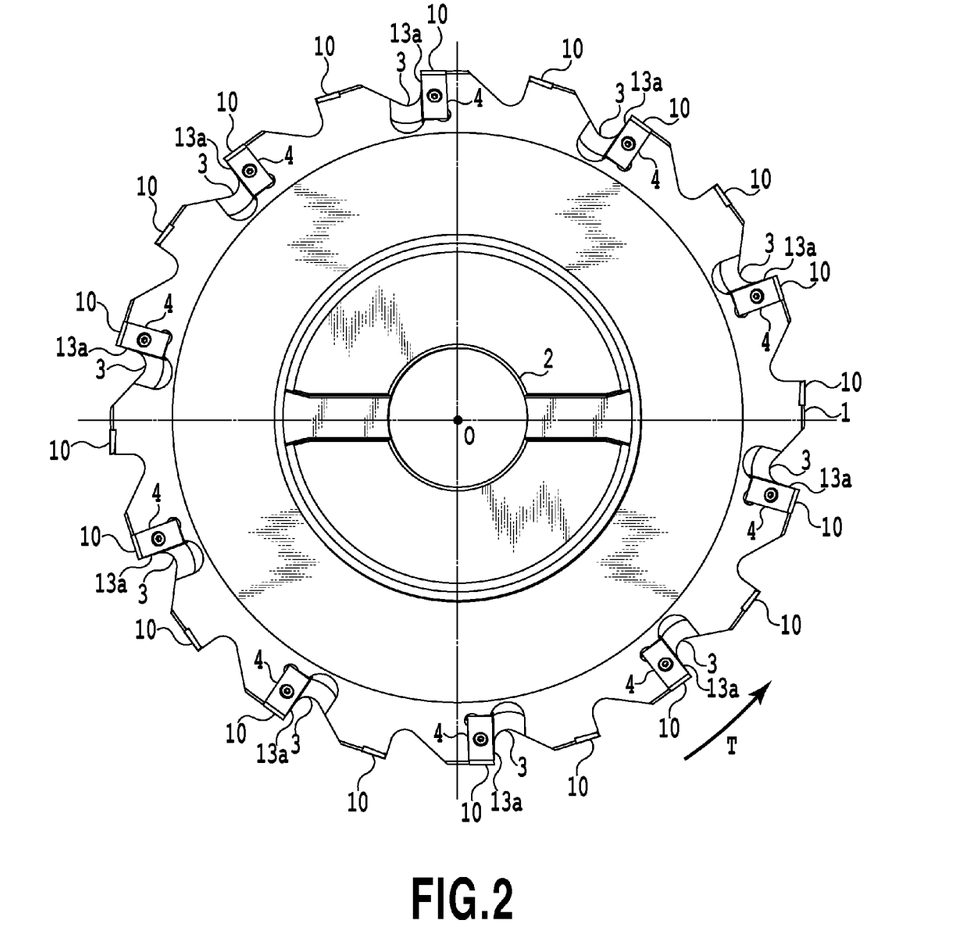
FIG. 2 is a front view of the tooth cutter shown in FIG. 1.
Figure 3A:
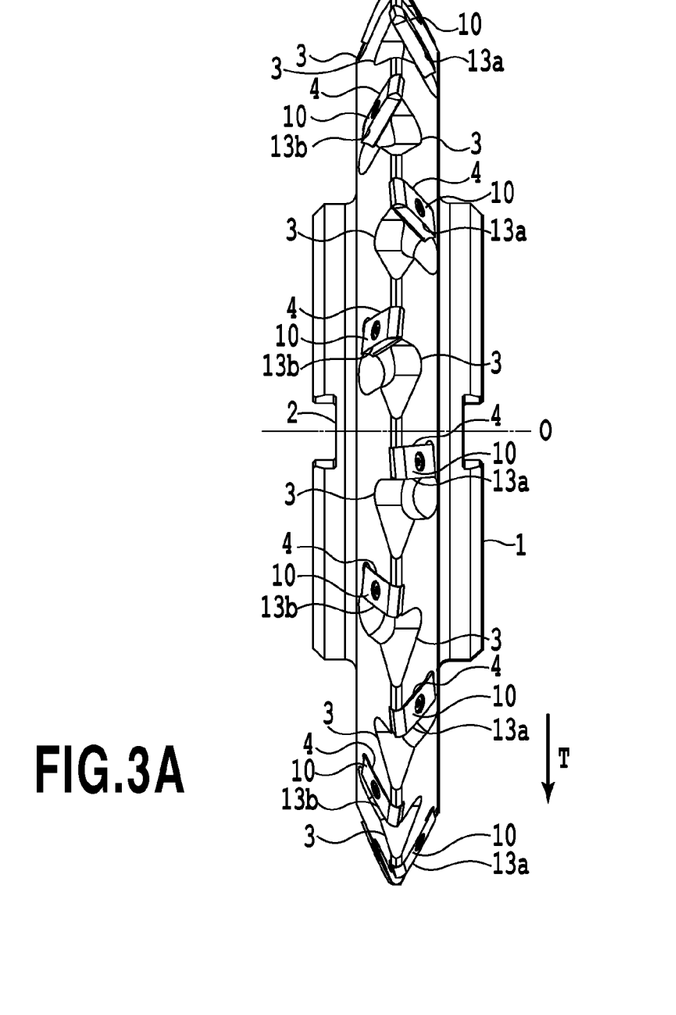
FIG. 3A is a side view of the tooth cutter shown in FIG. 1.
Figure 3B:
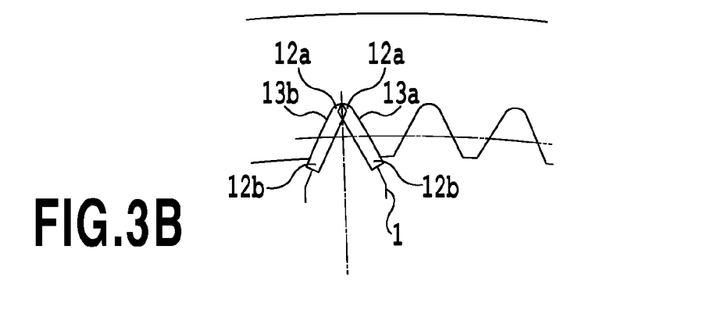
FIG. 3B is a conceptual diagram explaining a cutting situation of the tooth cutter shown in FIG. 1.

A tooth cutter according to the present embodiment, as shown in FIG. 1 to FIG. 3, comprises a tool body 1, insert bodies 10, and mounting screws 20. The tool body 1 is formed in a substantial disc shape to be rotated around an axis line O. The insert body 10 is removably mounted on an outer peripheral portion of the tool body 1 as an edge portion. The mounting screw 20 is used for mounting the insert body 10 on the tool body 1.

The tool body 1 is made of a steel material or the like and is provided with a through hole 2, a plurality of chip pockets 3 and a plurality of insert mounting seats 4. The through hole 2 is formed to penetrate through a central portion of the tool body 1 along an axis line O and is used for mounting the tool body 1 on a main spindle of a working machine. The plurality of the chip pockets 3 are formed to be recessed in a staggered manner in the outer peripheral portion of the tool body 1 along a circumferential direction to facilitate generation, accommodation, and discharge of chips during cutting. Each of the plurality of the insert mounting seats 4 is formed on a wall face in each of the insert pockets 3 directed in a tool rotational direction T to seat the insert body 10 thereon.

Figure 4:
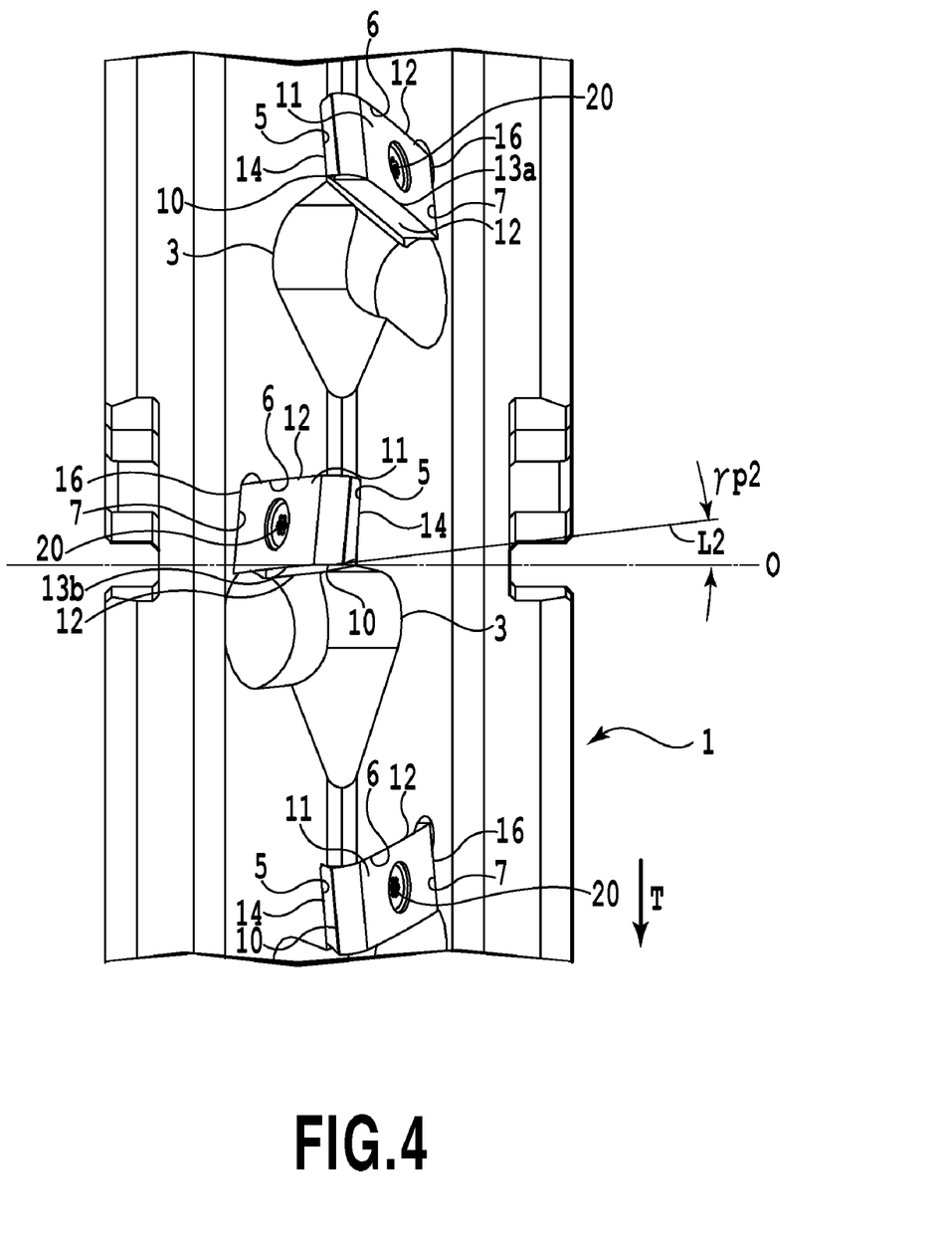
FIG. 4 is a partially enlarged view in FIG. 3A.
Figure 5:
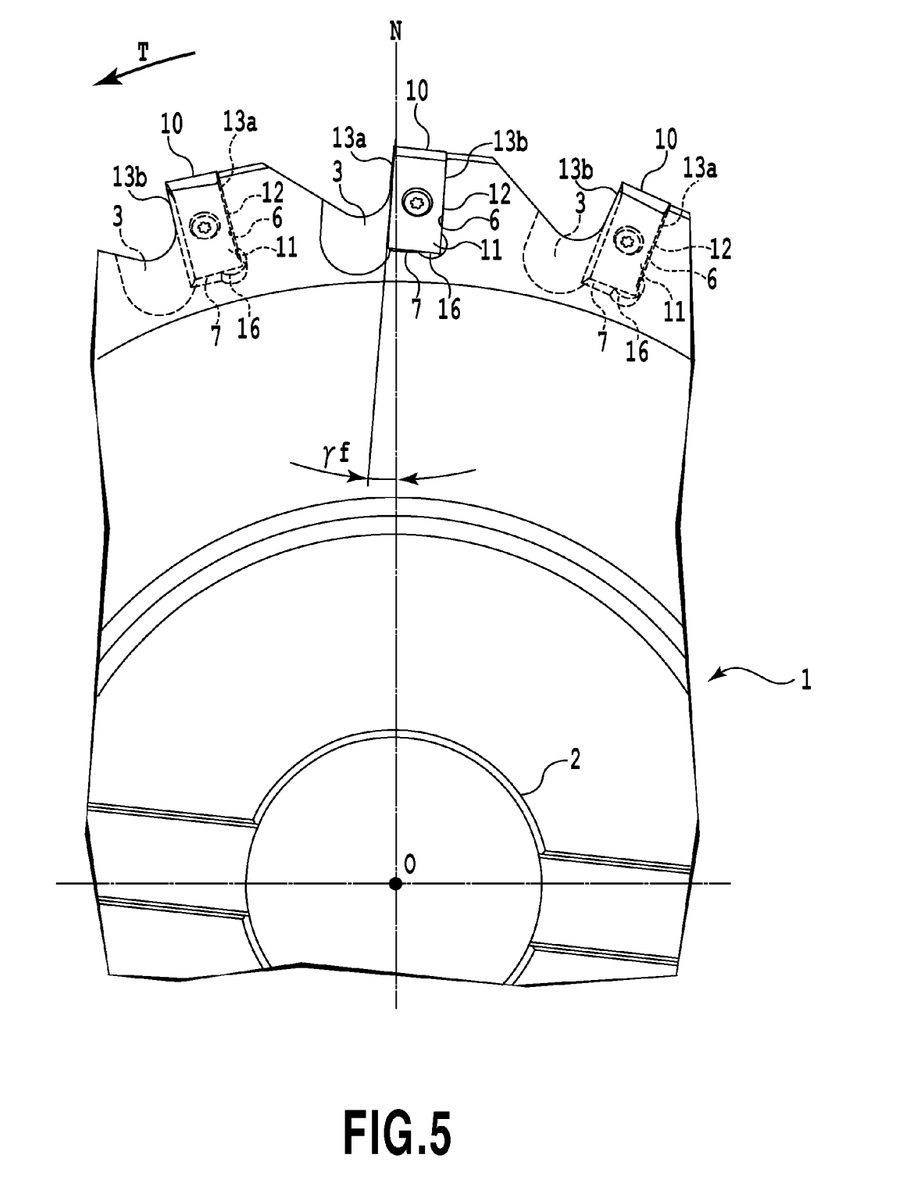
FIG. 5 is a partially enlarged view in FIG. 2.

The insert mounting seat 4 is, as shown in FIG. 4, provided with a bottom face 5 formed as a flat plane on which the insert body 10 is located, a first side wall 6 rising from the bottom face 5, the side wall 6 being directed in the tool rotational direction T, and a second side wall 7 directed in an outer peripheral side of the tool body 1. The bottom face 5 has a screw hole in a female screw shape formed therein to engage the mounting screw 20. The insert mounting seat 4 is, as shown in FIG. 5, formed in such a manner that a radial rake angle γf becomes negative when the insert body 10 is mounted on the insert mounting seat 4. The insert mounting seats 4 constructed in this way are arranged alternately by equal intervals on right and left side faces of the tool body 1 along a circumferential direction so that the plurality of insert mounting seats 4 are arranged in a staggered manner.

Figure 6A:
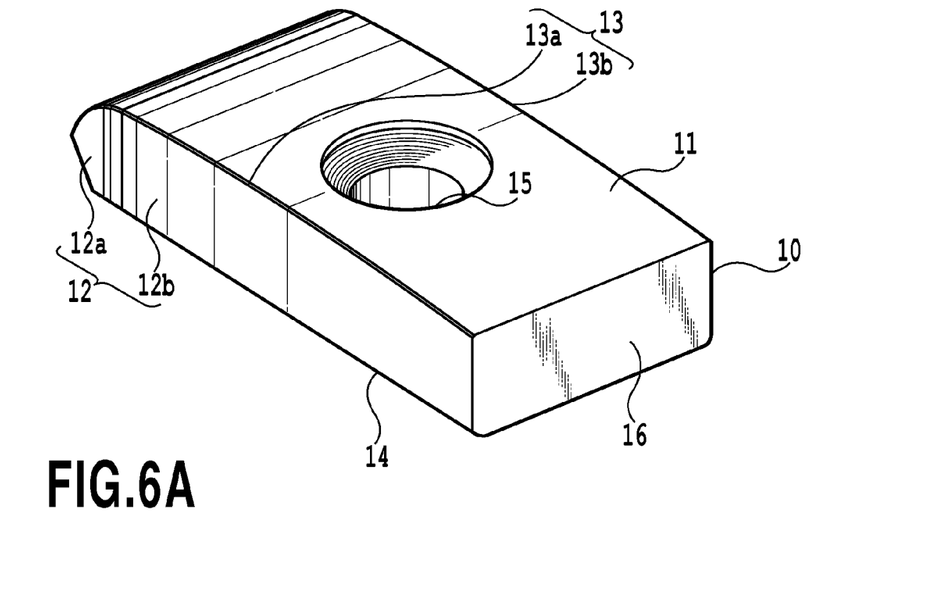
FIG. 6A is a perspective view showing a cutting insert mounted on the tooth cutter in FIG. 1.
Figure 6B:
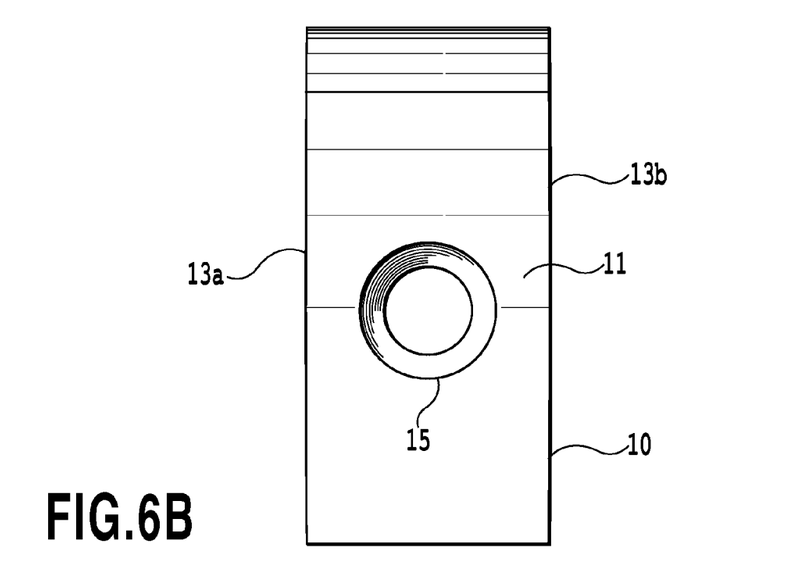
FIG. 6B is a plan view showing the cutting insert mounted on the tooth cutter in FIG. 1.

The insert body 10 is made of high speed steel, cemented carbide, cermet, ceramic, ultra high pressure sintered body or the like and is formed in a substantially oblong planar shape, in more detail in a substantially hog-backed shape. The insert body 10 is an insert formed in a so-called positive shape and is provided with a flank 11, a pair of rake faces 12, a pair of cutting edges 13, a seating face 14 and a mounting hole 15. The flank 11 is provided on an upper face of the insert body 10. The pair of the rake faces 12, are provided on right and left side faces in a long section side intersecting sharply with the flank 11. The pair of the cutting edges 13, are provided in intersection ridge line portions between the rake faces 12 and the flank 11. The seating face 14 is provided on a lower face opposing the flank 11 to form a flat plane. The mounting hole 15 is formed to penetrate through a central portion in a thickness direction.

The insert body 10 is, as shown in FIG. 4, fixed to the insert mounting seat 4 removably. The insert body 10 is located on the bottom face 5 of the insert mounting seat 4 using the lower face opposing the flank 11 as the seating face 14, and thereafter, one of the pair of the rake faces 12 makes contact with the first side wall 6 of the insert mounting seat 4, and a contact face 16 composed of a flat plane provided in a side face at a short side is in contact with the second side wall 7 of the insert mounting seat 4. In this state, when the mounting screw 20 is screwed into the screw hole 20 through the mounting hole 15, the insert body 10 is fixed on the insert mounting seat 4. In addition, the insert body 10 is designed to be able to be mounted on the insert mounting seat 4 in any one of the right and left sides arranged in a staggered manner.

Figure 8A:
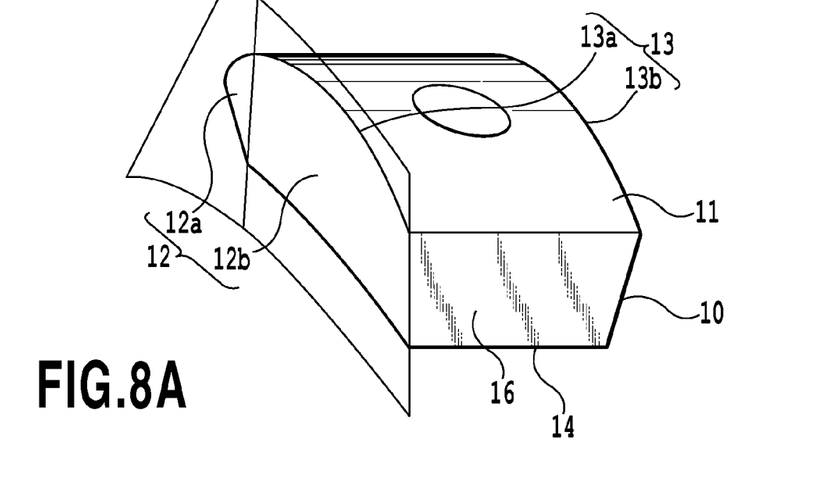
FIG. 8A is a conceptual diagram explaining a configuration of the cutting insert shown in FIG. 6.

The flank 11 is, as shown in FIG. 8A, formed in a substantially oblong shape in a plan view and is composed of a convex curved face slightly inflated in a substantial semi-circle shape.

Figure 8B:
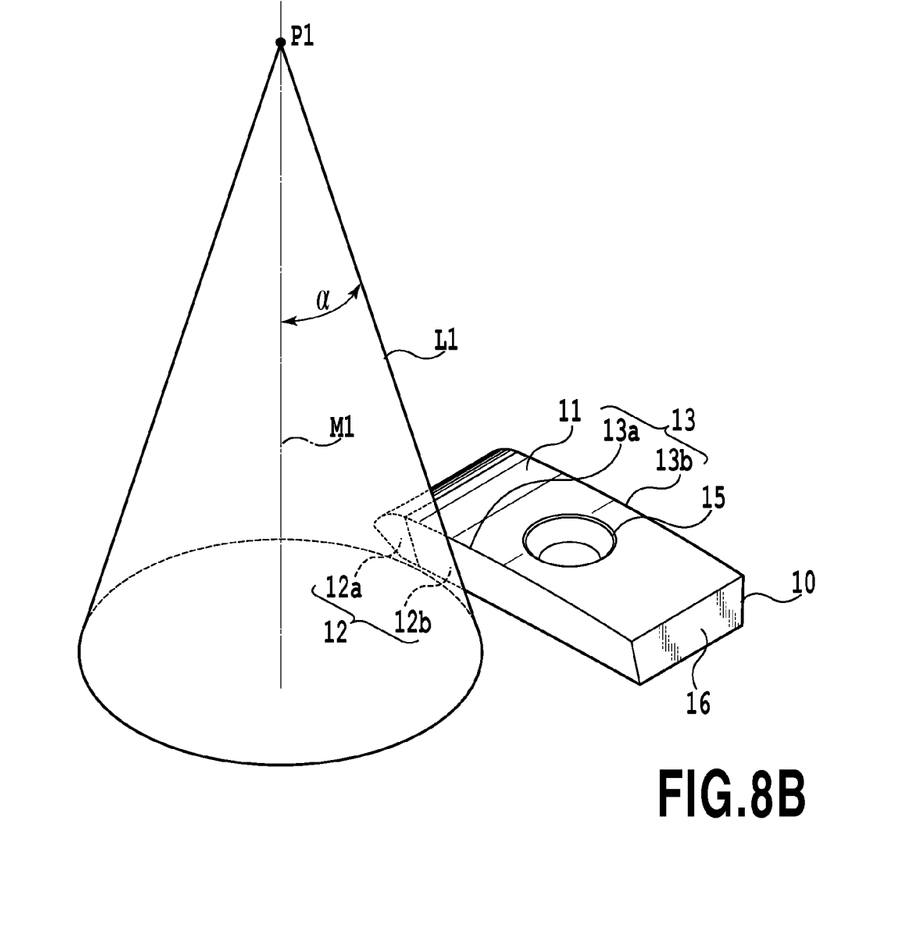
FIG. 8B is a conceptual diagram explaining an inclination state of a rake face of the cutting insert shown in FIG. 6.

The rake face 12 is, as shown in FIG. 8A and FIG. 8B, composed of two concave curved faces constituting respective parts of substantially conical side faces inclined inside of the insert body 10 from the flank 11 toward the seating face 14. The two concave curved faces are constructed of a first concave curved face provided in a first, front end portion 12a located in an outer peripheral side of the tool body 1 and a second concave curved face provided in a second portion 12b which is other than, and rearward of, the front end portion 12a. The two concave curved faces are formed in such a manner that an apex P1 of one cone is shifted from an apex P2 of the other to form buses L1 and L2 of the respective cones along the cutting edge 13. The apexes P1 and P2 are located above an upper side of the insert body 10, that is, on the side of the flank 11. An inclination angle of the front end portion 12a is set to be the same as that of the second portion 12b, and the two concave curved faces are smoothly connected to form one rake face 12. An inclination angle α of the rake face 12, that is, an angle made by a conical axis M1(M2) of the concave curved face of the front end portion 12a and the bus L1 (L2) is preferably set within a range of 10° to 20°, for example, is set to 15°.

In the rake face constructed in this way, an axial rake angle γp is, as shown in FIG. 4, positive in at least a large part of the portion other than the front end portion 12a when the insert body 10 is mounted on the insert mounting seat 4. In addition, the axial rake angle γp decreases as it comes closer to an outer peripheral side of the tool body 1. An axial rake angle γp1 made by the bus L1 of the cone in the front end portion 12a and an axis line O thereof is preferably set within a range of 0° to 10°, for example, is set in a range of 0.0° to 6.6°. Further, an axial rake angle γp2 made by the bus L2 of the cone in the second portion 12b and the axis line O is preferably set within a range of more than 0° to less than 15°, for example, is set in a range of 6.6° to 9.0°.

As shown in FIG. 5, when the insert body 10 is mounted on the insert mounting seat 4, an angle made by the cutting edge 13 and a diameter line N perpendicular to the axis line O, that is, a radial rake angle γf, is negative in a front view of the tool body 1 as seen from a direction opposing the flank 11. The radial rake angle γf is substantially constant over an entire length of the cutting edge 13 and is preferably set within a range of −10° to 0°, for example, is set to −3.8°.

An orthogonal rake angle γo is positive in at least a large part of the portion other than the front end portion 12a when the insert body 10 is mounted on the insert mounting seat 4. In addition, the orthogonal rake angle γo decreases as it comes closer to an outer peripheral side of the tool body 1. An orthogonal rake angle γo1 in the front end portion 12a is set within a range of 5.5° to 9.4°, for example. Further, an orthogonal rake angle γo2 in the second portion 12b is set within a range of 9.4° to 9.6°, for example. In addition, a cutting edge inclination angle λ is positive and increases as it comes closer to the outer peripheral side of the tool body 1. A cutting edge inclination angle λ1 in the front end portion 12a is set within a range of 7° to 15°, for example. Further, a cutting edge inclination angle λ2 in the second portion 12b is set within a range of 0° to 7°, for example.

Figure 7A:
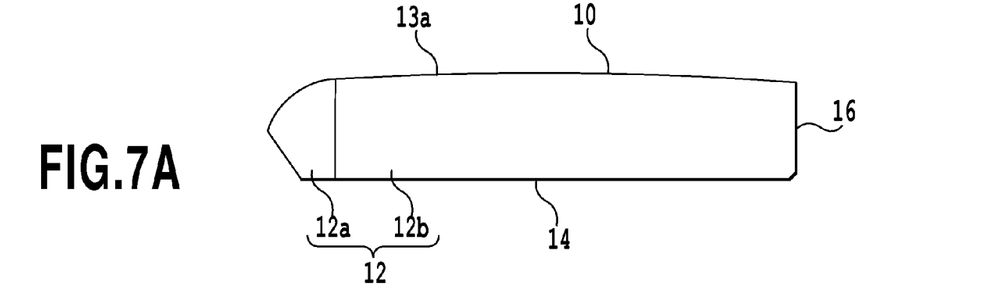
FIG. 7A is a left side view showing the cutting insert in FIG. 6.
Figure 7B:
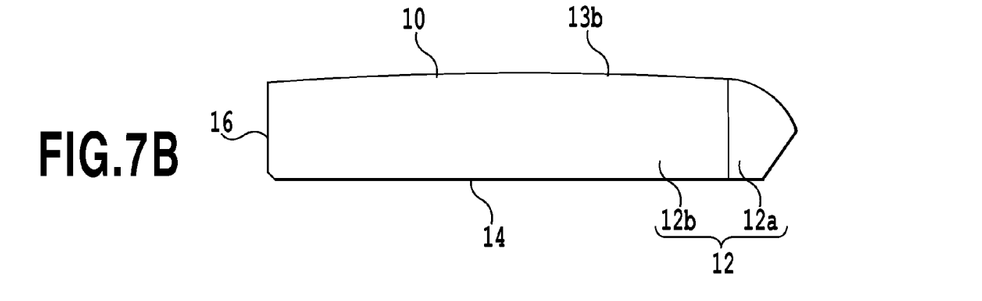
FIG. 7B is a right side view showing the cutting insert in FIG. 6.
Figure 7C:
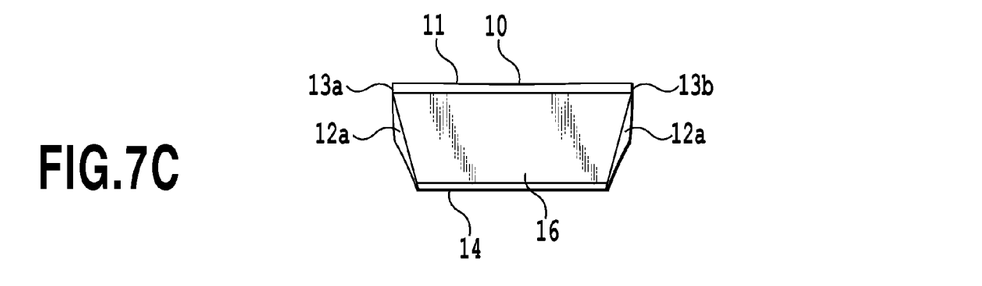
FIG. 7C is a front view showing the cutting insert in FIG. 6.
Figure 7D:
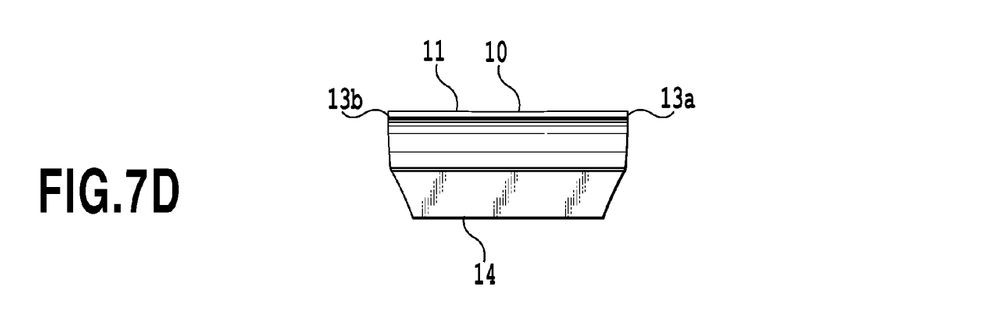
FIG. 7D is a back view showing the cutting insert in FIG. 6.

The cutting edge 13 is, as shown in FIG. 7A and FIG. 7B, formed in a substantial involute curved line shape having a convex configuration in a side view of the insert body 10 as seen from a direction opposing the rake face 12 and is formed so that the rotational path of the cutting edge 13 has an involute curved line. The cutting edge 13 is also, as shown in FIG. 6B, formed in a substantially straight line shape in a plan view of the insert body 10 as seen from a direction opposing the flank 11.

The cutting edges 13 are provided in respective ridge portions of a pair of the rake faces 12 to form a pair of the cutting edges 13. The cutting edge 13 can be, as shown in FIG. 3A, used as a right cutting edge 13a arranged in the right side of the rake face 12 and as a left cutting edge 13b arranged in the left side of the rake face 12 in a state where the insert body 10 is mounted on the tool body 1. That is, the insert bodies 10 each having the same configuration are mounted on the respective insert mounting seats 4 arranged in a staggered manner, so that the right cutting edges 13a and the left cutting edges 13b are alternately located. The right and left cutting edges 13a and 13b are, as shown in FIG. 3B, designed to form a continuous single cutting edge with rotation of the tool body 1 around an axis line. An involute curved line drawn by the series of the cutting edges is transferred to a work piece to cut out an involute tooth profile.

The tooth cutter is mounted on the main spindle of the working machine and feed is given in a direction intersecting with the axis line O with the tool body 1 being made to rotate around its axis line O. Thus the tooth cutter is moved to make contact with the work piece for use. In addition, as shown in FIG. 3B, the involute curved line made by the rotational track of the cutting edge 13 is transferred to the work piece, thus processing tooth grooves of the gear one by one. That is, the tooth cutter is used as a formed tooth cutting tool for cutting the tooth grooves of the involute gear by a forming method suitable for tooth cutting on, for example, an internal gear of a large module used in a large-sized industrial machine such as a construction machine.

Further, the insert body 10 attached to the tooth cutter is, for example, in a case where the right cutting edge 13a is damaged due to cutting, used as the left cutting edge 13b by changing the mounting position to the insert mounting seat 4 from right to left. That is, the single insert body 10 can be used twice. In addition, the rake face 12 can be reground to increase the number of times of use. Since the regrinding is regularly possible by two or three times, the single insert body can be used by six to eight times.

Hereinafter, an operation of the tooth cutter according to the present embodiment constructed in this way will be explained.

With the tooth cutter of the present embodiment, since the rake face 12 is formed to be inclined inside of the insert body 10 from the flank 11 toward the seating face 14, the axial rake angle γp, when the insert body 10 is mounted on the tool body 1, can be changed to be in a positive direction.

In this case, the front end portion 12a of the rake face 12 located in the outer peripheral side of the tool body 1 is composed of a concave curved face constituting a part of the substantially conical shaped side face, which therefore can prevent the involute curved line made by the cutting edge 13 as a portion corresponding to a round portion of the tooth bottom in the involute gear from changing into a different line in a case where the rake face 12 is inclined. The second portion 12b is also composed of a concave curved face constituting a part of the substantially conical shaped side face, which therefore can prevent the involute curved line made by the cutting edge 13 as a portion corresponding to the tooth profile in the involute gear from changing into a different line in a case of increasing an inclination angle α of the rake face 12. In consequence, the inclination angle α of the rake face 12 can be set to a desired angle. By applying a large inclination angle α to the rake face 12, the axial rake angle γp when the insert body 10 is mounted on the tool body 1 can be positive. Even if the insert body 10 is arranged in such a manner that the radial rake angle γf is negative, since the orthogonal rake angle γo and the cutting edge inclination angle λ change in a positive direction by increasing the axial rake angle γp, the cutting performance is improved to reduce the cutting resistance. As a result, since the chattering vibration is restricted and the cutting heat is reduced, excellent processing accuracy can be obtained and the damage or the like of the cutting edge can be prevented to achieve extension of tool lifetime.

Since the cutting edge 13 is formed to form a substantially straight line shape in a plan view as seen from a direction opposing the flank 11, the radial rake angle γf when the insert body 10 is mounted on the tool body 1 is substantially constant over an entire length of the cutting edge 13. As a result, variations in cutting performance of the cutting edge 13 in the longitudinal direction can be restricted. In addition, since a contact starting point between a work piece and the cutting edge 13 simply changes from a center direction of the insert body 10 toward an outer peripheral direction thereof, chipping and fracture of the cutting edge 13 can be prevented. In addition, the axial rake angle γp decreases as it comes closer to the outer peripheral side of the tool body 1, and the orthogonal rake angle γo1 in the front end portion 12a is smaller than the orthogonal rake angle γo2 in the second portion 12b. Therefore, damage of the cutting edge 13 as a portion supposed to cut a tooth bottom of the involute gear which is the most vulnerable to damage can be prevented.

Further, since the rake face 12 is formed of the concave curved face, a discharge direction of chips discharged by cutting is directed in the center direction of the tool body 1. Therefore, deterioration in quality of a processed face due to sliding contact of chips with the processed face can be prevented.

It should be noted that in the present embodiment, the rake face is constructed of the two concave curved faces constituting respective parts of the substantially conical side faces, but instead of this construction, for example, the front end portion 12a may be constructed of a concave curved face constituting a part of the substantially conical side face and the second portion 12b may be constructed of an inclination face formed of a flat plane. Further, the rake face 12 may be constructed of three or more concave curved faces constituting respective parts of the substantially conical side faces.

In the present embodiment, the inclination angle α of the rake face 12 is set constant with no difference in the inclination angle between the front end portion 12a and the second portion 12b, but instead of this construction, the inclination angle α may be different depending on a position of the portion.

In the present embodiment, the inclination angle α of the rake face 12 is set to 15°. However, the inclination angle α is not limited thereto, and may be set to any other angle. In consideration of improvement of cutting performance and a reduction of cutting resistance, the inclination angle α of the rake face 12 is preferably set within a range of 10° to 20°, advantageously preferably within a range of 12° to 18°. If the inclination angle α of the rake face 12 is less than 10°, since the rake face 12 is formed in such a manner that the radial rake angle γf when the insert body 10 is mounted on the insert mounting seat 4 is negative, the axial rake angle γp would be negative even in the second portion 12b when the insert body 10 is mounted on the insert mounting seat 4. Therefore, there is a possibility that a desired effect can not be obtained. If the inclination angle α of the rake face 12 exceeds 20°, there is a possibility that an edge strength is deteriorated, and that the seating face 14 decreases resulting in a problem that a size of the insert body 10 must be increased.

In addition, in the present embodiment, the axial rake angle γp1 in the front end portion 12a is set within a range of 0.0° to 6.6°, and the axial rake angle γp2 in the second portion 12b is set within a range of 6.6° to 9.0°. However, the axial rake angle γp is not limited thereto, and may be set to any other angle. In consideration of achieving improvement of cutting performance, a reduction of cutting resistance and also maintaining an edge strength, the axial rake angle γp1 in the front end portion 12a is preferably set within a range of 0° to 10°, advantageously preferably within a range of 0° to 8°. In addition, the axial rake angle γp2 in the second portion 12b is preferably set within a range of more than 0° to less than 15°, advantageously preferably within a range of more than 0° to less than 10°. If the axial rake angle γp2 is equal to 0° or less, the cutting becomes so-called negative cutting and there occurs a possibility that a reduction effect of the cutting resistance can not be expected. If the axial rake angle γp2 is equal to or more than 15°, an edge angle becomes sharp and there occurs a possibility that chipping or fracture of the edge during cutting tends to be easily generated.

In addition, in the present embodiment, the radial rake angle γf is set to −3.8°. However, the radial rake angle γf is not limited thereto, and may be set to any other angle. In consideration of a restriction effect of chipping or fracture generation at the time of a contact starting point between a work piece and the cutting edge 13, the radial rake angle γf is preferably set within a range of −10° to 0°, advantageously preferably within a range of −8° to −3°. If the radial rake angle γf is less than −10°, the cutting resistance becomes large and therefore, there occurs a possibility that deterioration of processing accuracy, spread of tool damage and the like due to generation of chattering vibrations and the like are brought in. If the radial rake angle γf is more than 0°, there occurs a possibility that chipping or fracture of the edge at the time of contact starting between the work piece and the cutting edge 13 is generated.

In addition, in the present embodiment, the orthogonal rake angle γo1 in the front end portion 12a is set within a range of 5.5° to 9.4°, and the orthogonal rake angle γo2 in the second portion 12b is set within a range of 9.4° to 9.6°. However, the orthogonal rake angle γo is not limited thereto, and may be set to any other angle. The orthogonal rake angle γo1 in the front end portion 12a is preferably set within a range of −5° to 20°. In addition, the orthogonal rake angle γo2 in the second portion 12b is preferably set within a range of more than 0° to less than 15°.

In addition, in the present embodiment, the cutting edge inclination angle λ1 in the front end portion 12a is set within a range of 7° to 15°, and the cutting edge inclination angle λ2 in the second portion 12b is set within a range of 0° to 7°. However, the cutting edge inclination angle λ is not limited thereto, and may be set to any other angle. The cutting edge inclination angle λ1 in the front end portion 12a is preferably set within a range of −5° to 20°, and the cutting edge inclination angle λ2 in the second portion 12b is preferably set within a range of 0° to 10°.

Figure 9A:
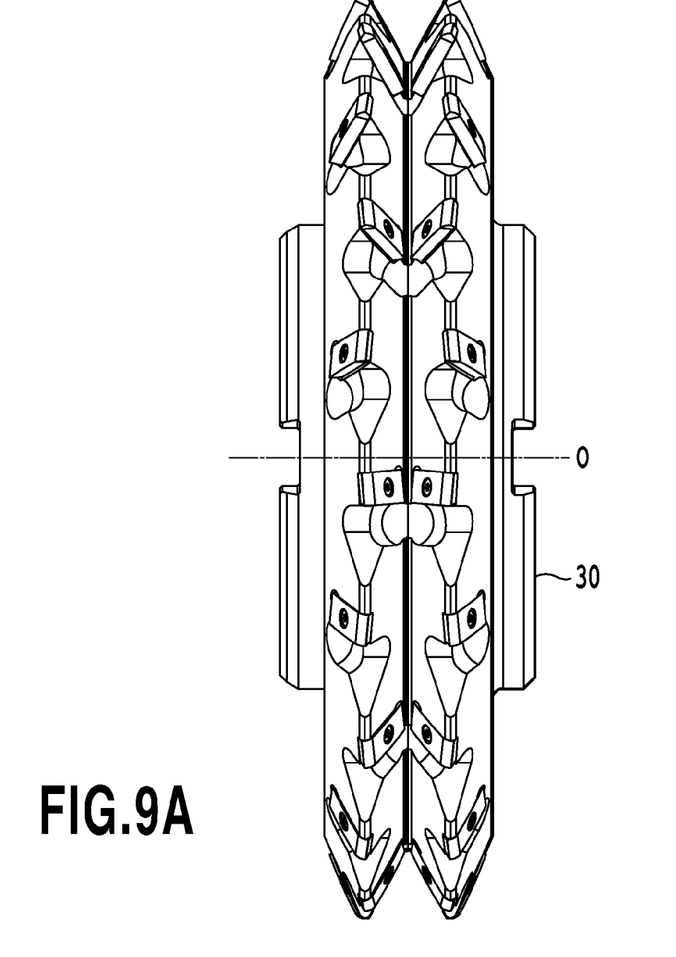
FIG. 9A is a side view showing a modification of the tooth cutter shown in FIG. 1.
Figure 9B:
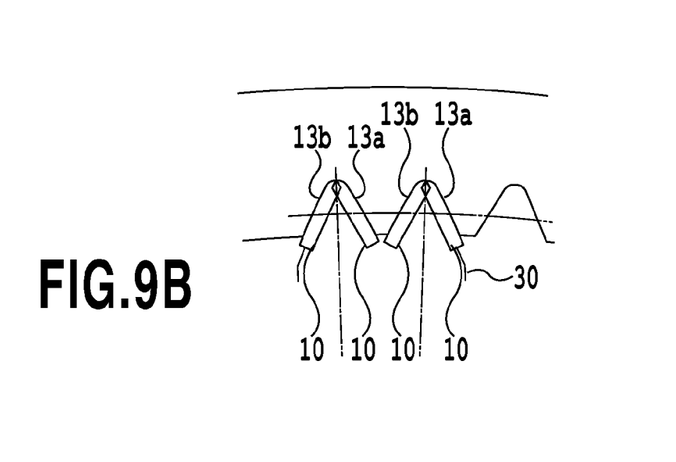
FIG. 9B is a conceptual diagram explaining a cutting situation of the modification in the tooth cutter shown in FIG. 1.

The present embodiment is explained by taking the tooth cutter composed of a single type of tool body 1 for cutting tooth grooves of the internal gear one by one, as an example with reference to FIG. 1 to FIG. 5 but the indexable tooth cutting tool according to the present invention is not limited thereto, and instead of this, for example, as shown in FIG. 9A and FIG. 9B, there may be adopted a duplex type of tool body 30 for cutting two tooth grooves of the gear at the same time. Further, in addition to the internal gear, there may be adopted a tooth cutting tool such as a hob cutting tool for cutting tooth grooves of other types of gears such as an external gear.

In the present embodiment, the insert body 10 is formed in a substantially oblong planar shape, in more detail, substantially hog-backed shape, but the insert body 10 is not limited thereto as a shape of the insert and any other shape such as a triangular planar shape may be adopted.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A cutting insert for removably mounting on an insert mounting seat formed in an outer peripheral portion of a substantially disc-shaped tool body which is rotated around an axis line, comprising:
   a substantially planar insert body;
   a flank provided on an upper face of the insert body;
   a rake face provided on a side face of the insert body to intersect with the flank; and
   a cutting edge provided in an intersection ridge line portion between the rake face and the flank, wherein:
   the cutting edge is formed in a substantially involute curved line shape in a side face view of the insert body,
   the rake face is inclined to an inside of the insert body from an upper face toward a lower face thereof, and
   at least a front end portion of the rake face arranged in an outer peripheral side of the tool body is formed in a concave curved face shape constituting a part of a substantially conical side face.

2. A cutting insert according to claim 1, wherein
   the rake face is constructed of a plurality of concave curved faces constituting respective parts of the substantially conical side faces.

3. A cutting insert according to claim 1, wherein
   the cutting edge is formed in a substantially straight line shape in a plan view.

4. An indexable tooth cutting tool in which the cutting insert according to claim 1 is arranged, comprising:
   a substantial disc-shaped tool body which is rotated around an axis line; and
   a plurality of insert mounting seats provided in an outer peripheral portion of the tool body in a staggered manner along a circumferential direction, wherein:
   the cutting insert is removably mounted on the insert mounting seat in such a manner that a radial rake angle is negative.

* * * * *